United States Patent Office 2,963,404
Patented Dec. 6, 1960

2,963,404

TANNATE CANDY MAKING, AND PRODUCT

Henry F. Hammer, Seaford, N.Y., and Vincent R. Ciccone, Montclair, N.J., assignors to Chas. Pfizer & Co., Inc., Brooklyn, N.Y., a corporation of Delaware No Drawing. Filed Sept. 5, 1958, Ser. No. 759,131

3 Claims. (Cl. 167—82)

This invention relates to an improvement in the manufacture of medicated candy products. More particularly, it relates to an improvement in the manufacture of medicated candy products suitable for use in the oral cavity and to the products so produced.

The incorporation of medicaments into candy dosage form provides many advantages in the administration of said medicaments. For example, candy dosage form is usually made pleasant to the taste by the incorporation of flavoring agents. Further, the use of candy dosage form generally provides a longer period of contact of the medicament with the oral cavity and general environs. providing a more effective and intimate contact of the infected area with the chosen agent.

In the manufacture of medicated candy products, the medicament is usually added to a molten candy mass, the resultant mixture thoroughly mixed to ensure proper distribution of the medicament and the mixture, while molten, poured onto cooling tables where it solidifies to a semi-solid mass which may then be formed into a desired shape for dispensing a unit dosage of the medicament. Alternatively, the hot candy mass may be poured into molds, the size and shape of which may be determined as desired. For more effective application, the final candy product should contain the chosen medicament uniformly distributed throughout for obvious reasons as can be appreciated by those skilled in the art, in particular, to ensure uniform levels of the medicament in the infected area.

Many difficulties are encountered in attempting to blend solid medicaments, particularly amorphous solid medicaments such as 2-(2-diethylaminoethoxy) ethyl 1-phenyl-1-cyclopentanecarboxylate tannate into molten candy masses. The resultant products are often found to be lacking in uniform distribution of the solid medicament which is obviously undesirable. In addition, the product is unattractive due to opaque spots caused by agglomerates of the medicament.

The above-mentioned 2-(2-diethylaminoethoxy) ethyl 1-phenyl-1-cyclopentanecarboxylate tannate is a salt of tannic acid and the basic compound, which is a therapeutic agent possessing antispasmodic properties exceeding those of atropine. It is particularly effective clinically in suppressing the cough reflex as it acts with a unique selectivity on the cough center in the medulla. This compound is particularly valuable as an anti-tussive agent. The oral administration of this compound is attended by certain difficulties. In this connection, it should be noted that the compound, as well as its common acid addition salts are often very bitter and unpleasant to taste. To alleviate this deficiency, a tannic acid salt of this compound is generally employed since it is tasteless and possesses other unique properties, one in particular, being of substantially limited solubility which provides a controlled release of the medicament.

As mentioned above, the addition of amorphous solid medicaments to molten candy masses is fraught with difficulties. For example, when the medicament, such as a 2-(2-diethylaminoethoxy) ethyl 1-phenyl-1-cyclopentanecarboxylate tannate, is added to a molten candy mass, blended by the usual procedure, cooled and punched to a lozenge, the resultant lozenge contains many opaque spots and apparently lacks uniform distribution of the medicament. It is found that when the temperature of the candy mass is increased to above 120° C. to enable a more uniform distribution, considerable decomposition of the therapeutic agent may take place. Attempts to add the medicament in an admixture of sucrose results in crystallization of the molten candy mass to a greater or lesser extent depending on the amounts of sucrose employed.

It has been unexpectedly found that a solid amorphous medicament such as 2-(2-diethylaminoethoxy) ethyl 1-phenyl-1-cyclopentanecarboxylate tannate, may be uniformly blended into a molten candy mass by first premixing the amorphous solid with finely ground solid candy of the same general composition as the molten mass. Generally it is found convenient to employ the finely ground candy in an amount substantially equal to the weight of the tannate. The mixture is easily blended using standard procedures well known in the art, for example, mechanical mixing or grinding. After the mixture is obtained, it is preferably added portionwise into the molten candy mass which is thoroughly mixed after each addition. Of course, the entire mixture may be added in one portion which, however, may necessitate prolonged mixing and is not preferred, though operable. The resultant mass is then cooled to semi-solid and troches formed in the usual manner. The resultant product is uniform throughout with no opaque spots.

The candy base employed in the present process may be one of several generally employed in the manufacture of hard candy. Such candy bases usually comprise corn syrup (or invert sugar) together with sucrose (common cane sugar). Usually, the corn syrup and sucrose are blended in water by heating and the water removed by heating, preferably under vacuum, to produce a viscous mass known as the candy base, which after this treatment contains little moisture, usually less than 1% of the total mass. The temperature of the molten candy mass is preferably reduced to a temperature below 120° C. for reasons mentioned above and to avoid the unnecessary use of excess overage of the therapeutic agent. As is customary in such therapeutic compositions, an overage of agent amounting to about 10% by weight is generally employed. If desired, various artificial flavoring agents such as cherry flavor, lemon flavor, etc. may be added to the molten candy mass, as well as appropriate coloring agents therefor.

Tannic acid salts of 2-(2-diethylaminoethoxy) ethyl 1-phenyl-1-cyclopentanecarboxylate may be prepared by contacting one part by weight of the basic compound in an inert polar organic solvent medium with tannic acid in an amount that is in the range of from about one to about five parts by weight. Alternatively, a common acid addition salt of 2-(2-diethylaminoethoxy) ethyl 1-phenyl-1-cyclopentanecarboxylate may be reacted with from 1 to about 5 parts of tannic acid in water adjusted to a pH of from about 6.0 to 7.0. The inert polar organic solvent is preferably selected from the group consisting of N,N-di-lower alkyl-substituted derivatives of lower alkanecarboxamides, water-miscible lower alkyl esters of lower alkanoic acids, water-miscible lower alkanols, lower alkyl ketones, tetrahydrofuran and dioxane. Such solvents include: N,N-dimethylformamide, N,N-diethylformamide, N,N-dimethylacetamide and the like; methyl formate, ethyl acetate, isopropyl acetate, methyl propionate, etc.; methanol, ethanol, propanol, ethylene glycol, propylane glycol, glycerol and the like; acetone, methyl ethyl ketone, methyl isobutyl ketone, etc.

When an aqueous solution of a common acid addition salt of the subject compound, such as the hydrochloride, hydrobromide, hydroiodide, nitrate, sulfate, phosphate, acetate, gluconate, citrate, tartrate and the like, is employed with tannic acid, the pH of the medium should be adjusted to about 6.0 to 8.0 with an aqueous solution of an alkali metal or alkaline earth metal hydroxide or bicarbonate or an alkali metal carbonate. The reaction is conveniently effected at room temperature although temperatures of from 0° to 100° C. may be used.

The term "2-(2-diethylaminoethoxy) ethyl 1-phenyl-1-cyclopentanecarboxylate tannate," as employed herein, refers to the tannic acid addition salts obtained by reaction of the base compound with tannic acid as described herein and includes products which contain the acid and base compounds in 1.0:1.0 molar ratio up to 1.0:5.0 molar ratio.

The following examples are given by way of illustration and are not to be considered as limitations of the present invention many variations of which are possible without departing from the spirit or scope thereof.

Example I

A candy base is prepared by combining 345 pounds of sucrose dissolved in 20 gallons of water with 230 pounds of 43° Baumé corn syrup in a steam-jacketed kettle. The vessel is heated to 112° C. and then pumped into a storage vessel which feeds a continuous cooker. As the syrup passes through a coil in the cooker, it reaches a temperature of 145°–150° C. and is then fed, in 150 pound batches to a receiving kettle maintained at 28–29 inches of vacuum by means of multi stage, steam vacuum ejectors for a period of about 7 minutes. At this stage, the candy base is composed of:

64.8% sugar solids
34.6% corn syrup solids
0.6% moisture

The 150 pounds of candy base are then transferred to a mixing kettle which has been lubricated with a mixture of beeswax, magnesium carbonate and white oil. At this point 135 cc. of cherry flavor (12009) and brilliant red crimson paste color (30 g.) are added. A mixture of solid candy base which has been powdered and an equal weight of 2-(2-diethylaminoethoxy) ethyl 1-phenyl-1-cyclopentanecarboxylate tannate after intimate mixing and powdering, is added portionwise with mixing after each addition. The batch then is thoroughly mixed and is transferred to cooling slabs where it is further mixed and cooled to the proper consistency for forming.

The batch is placed in a horizontal automatic roller for feeding to a forming machine which punches out the troches. The individual troches contain 13.2 mg. (plus 10% average) of 2-(2-diethylaminoethoxy) ethyl 1-phenyl-1-cyclopentanecarboxylate tannate.

The batch, before cooling, may be poured into "pop" molds to produce products which are particularly useful in pediatric applications.

Example II

To a solution containing 23.64 g. of tannic acid dissolved in 600 ml. of distilled water there were added 2.0 g. of Dowex-1 (Dowex is the registered trademark name of the Dow Chemical Co., Midland, Michigan, for a series of proprietary synthetic ion-exchange resins) and the resulting mixture was continuously agitated for approximately six hours in order to remove any iron that might be present in the tannic acid. At the end of this time period, the ion-exchange resin was recovered from the aqueous solution by means of filtration and the purified tannic acid solution was adjusted to a pH of 6.0 by the addition of 1 N sodium hydroxide. To this solution there was then added dropwise a solution consisting of 7.88 g. of 2-(2-diethylaminoethoxy) ethyl 1-phenyl-1-cyclopentanecarboxylate citrate dissolved in 100 ml. of distilled water. Constant agitation of the reaction mixture was maintained throughout the addition which was conducted under a nitrogen atmosphere. The pH of the reaction solution was maintained in the range of pH 6.0–7.0 throughout this step by the simultaneous addition of a sufficient volume of 0.1 N sodium hydroxide solution. The tan granular precipitate which resulted was isolated by means of filtration and the solid product so obtained was then thoroughly washed by repulping in water and subsequently dried in vacuo at 40° C./1 mm. Hg for 12 hours. There were obtained 16.8 g. of 2-(2-diethylaminoethoxy) ethyl 1-phenyl-1-cyclopentanecarboxylate tannate wherein the acid and base components are present in a 1.0:2.3 molar ratio. Chemical assay of this colorless product revealed the fact that it contains 30% of 2-(2-diethylaminoethoxy) ethyl 1-phenyl-1-cyclopentanecarboxylate and 3.0% of water.

Example III

The same procedure as described in Example II was followed here except that 2-(2-diethylaminoethoxy) ethyl 1-phenyl-1-cyclopentanecarboxylate hydrochloride was employed as a starting material in place of the corresponding citrate. In the same manner, the hydrobromide, hydrofluoride, hydroiodide, nitrate, sulfate, phosphate, acetate, tartrate, gluconate and saccharate of 2-(2-diethylaminoethoxy) ethyl 1-phenyl-1-cyclopentanecarboxylate were also used. In every case, the product obtained was a tannic acid complex salt of 2-(2-diethylaminoethoxy) ethyl 1-phenyl-1-cyclopentanecarboxylate which was identical in every respect with that obtained in the previous example. Similarly, the yields afforded were substantially in the same order as that reported in the aforementioned example.

Example IV

The procedure described in Example I was followed here except for the fact that the amount of tannic acid employed was twice the weight of the 2-(2-diethylaminoethoxy) ethyl 1-phenyl-1-cyclopentanecarboxylate citrate used in Example II. There were obtained 16.2 g. or 2-(2-diethylaminoethoxy) ethyl 1-phenyl-1-cyclopentanecarboxylate tannate wherein the acid and base components are present in a 1.0:2.7 molar ratio. Chemical assay of this product revealed it to contain 31% of 2-(2-diethylaminoethoxy) ethyl 1-phenyl-1-cyclopentanecarboxylate and 3.0% of water.

Example V

The same procedure as described in the foregoing example was followed here except that the amount of tannic acid employed was equal to the weight of the 2-(2-diethylaminoethoxy) ethyl 1-phenyl-1-cyclopentanecarboxylate citrate used in Example II. The product obtained was the tannic acid complex salt of 2-(2-diethylaminoethoxy) ethyl 1-phenyl-1-cyclopentanecarboxylate wherein the acid and base components are present in a 1.0:3.7 molar ratio; the yield amounted to 10.9 g. Chemical assay of this product revealed it to contain 40.1% of 2-(2-diethylaminoethoxy) ethyl 1-phenyl-1-cyclopentanecarboxylate and 2.96% of water.

Example VI

The procedure described in Example II was followed here except for the fact that the weight of the tannic acid employed was five times that of the 2-(2-diethylaminoethoxy) ethyl 1-phenyl-1-cyclopentanecarboxylate citrate used in Example II. The product obtained was found to be a tannic acid complex salt of 2-(2-diethylaminoethoxy) ethyl 1-phenyl-1-cyclopentanecarboxylate wherein the acid and base components are present in a 1.0:2.3 molar ratio. Chemical assay of this product showed it to contain 30% of 2-(2-diethylaminoethoxy) ethyl 1-phenyl-1-cyclopentanecarboxylate and 3.0% of water.

Example VII

The procedure of Example II is repeated with the exception that 2-(2-diethylaminoethoxy) ethyl 1-phenyl-1-cyclopentanecarboxylate tannate is added to the molten candy mass without first premixing with powdered candy base. The resultant product contains many opaque spots and lacks uniform distribution of the therapeutic agent.

It is to be understood that the troche produced by the procedure of Example I is only representative of a specific embodiment of the present invention. The amount of therapeutic agent present in the product of the present process is not critical and may be varied within wide limits. Obviously, medicated candy products containing more or less than 13.2 mg. of the therapeutic agent per troche may be prepared by this process, as desired. For example, when 330.67 g. of the medicament is employed in the procedure of Example I, the resultant troche contains 16.5 mg. (plus 10% overage). The product obtained is characterized by the uniform distribution of the active agent throughout a solid, edible matrix which is especially useful for oral use. The procedure for preparing the tannate salts employed in the present invention is described in copending patent application, Serial No. 713,087, filed on February 4, 1958, which is a continuation-in-part and now abandoned.

What is claimed is:

1. A process for preparing 2-(2-diethylaminoethoxy) ethyl 1-phenyl-1-cyclopentanecarboxylate tannate containing candy which comprises the steps of preblending said 2-(2-diethylaminoethoxy) ethyl 1-phenyl-1-cyclopentanecarboxylate tannate with substantially an equal weight of finely-divided solid candy, said candy being comprised of carbohydrate and corn syrup solids, adding said preblend to a molten mass of said candy and thoroughly blending resultant mixture.

2. A process as claimed in claim 1 in which the molten candy mass is maintained at a temperature below 120° C. sufficient to maintain said candy mass in the molten state.

3. A therapeutic composition for oral use comprising a solid, edible matrix free of opaque spots and containing 2-(2-diethylaminoethoxy) ethyl 1-phenyl-1-cyclopentanecarboxylate tannate uniformly dispersed throughout its mass.

References Cited in the file of this patent

UNITED STATES PATENTS

| | | |
|---|---|---|
| 122,507 | Wills | Jan. 2, 1872 |
| 2,325,529 | Merrill | July 27, 1943 |
| 2,333,950 | Olsen | Nov. 9, 1943 |
| 2,842,585 | Morren | July 8, 1958 |

OTHER REFERENCES

Lyman: Am. Pharmacy, J. P. Lippincott Co., Phila., Pa. (1945), pp. 9–22.

Q.S. article by Dyer, Spring 1952, p. 18.